United States Patent
Garudadri

(10) Patent No.: US 7,136,815 B2
(45) Date of Patent: *Nov. 14, 2006

(54) METHOD FOR VOICE RECOGNITION

(75) Inventor: Harinath Garudadri, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 10/712,583

(22) Filed: Nov. 12, 2003

(65) Prior Publication Data

US 2004/0098258 A1 May 20, 2004

Related U.S. Application Data

(63) Continuation of application No. 09/760,076, filed on Jan. 12, 2001, now Pat. No. 6,681,207.

(51) Int. Cl.
*G10L 17/00* (2006.01)

(52) U.S. Cl. ...................................... 704/255

(58) Field of Classification Search ..................... None
See application file for complete search history.

(56) References Cited

U.S. PATENT DOCUMENTS 6,681,207 B1 * 1/2004 Garudadri ................... 704/256

* cited by examiner

*Primary Examiner*—Susan McFadden
(74) *Attorney, Agent, or Firm*—Philip R. Wadsworth; Charles D. Brown; Alex C. Chen

(57) ABSTRACT

A method improves voice recognition by improving storage of voice recognition (VR) templates. The improved storage means that more VR models can be stored in memory. The more VR models that are stored in memory, the more robust the VR system, and therefore the more accurate the VR system. Lossy compression techniques are used to compress VR models. In one embodiment, Mu-law compression and A-law expansion are used to compress and expand VR models. In another embodiment, Mu-law compression and Mu-law expansion are used to compress and expand VR models. VR models are compressed during a training process, and they are expanded during voice recognition.

7 Claims, 7 Drawing Sheets

METHOD FOR VOICE RECOGNITION

RELATED APPLICATIONS

This application is a continuation of Utility Application No. 09/760,076 entitled "SYSTEM AND METHOD FOR EFFICIENT STORAGE OF VOICE RECOGNITION" and filed on Jan. 12, 2001 now U.S. Pat. No. 6,681,207.

BACKGROUND

1. Field

The present invention pertains generally to the field of communications and more specifically to a system and method for improving storage of templates in a voice recognition system.

2. Background

Voice recognition (VR) represents one of the most important techniques to endow a machine with simulated intelligence to recognize user or user-voiced commands and to facilitate human interface with the machine. VR also represents a key technique for human speech understanding. Systems that employ techniques to recover a linguistic message from an acoustic speech signal are called voice recognizers. The term "voice recognizer" is used herein to mean generally any spoken-user-interface-enabled device.

The use of VR (also commonly referred to as speech recognition) is becoming increasingly important for safety reasons. For example, VR may be used to replace the manual task of pushing buttons on a wireless telephone keypad. This is especially important when a user is initiating a telephone call while driving a car. When using a phone without VR, the driver must remove one hand from the steering wheel and look at the phone keypad while pushing the buttons to dial the call. These acts increase the likelihood of a car accident. A speech-enabled phone (i.e., a phone designed for speech recognition) would allow the driver to place telephone calls while continuously watching the road. In addition, a hands-free car-kit system would permit the driver to maintain both hands on the steering wheel during call initiation.

Speech recognition devices are classified as either speaker-dependent (SD) or speaker-independent (SI) devices. Speaker-dependent devices, which are more common, are trained to recognize commands from particular users. In contrast, speaker-independent devices are capable of accepting voice commands from any user. To increase the performance of a given VR system, whether speaker-dependent or speaker-independent, training is required to equip the system with valid parameters. In other words, the system needs to learn before it can function optimally.

An exemplary vocabulary for a hands-free car kit might include the digits on the keypad; the keywords "call," "send," "dial," "cancel," "clear," "add," "delete," "history," "program," "yes," and "no"; and the names of a predefined number of commonly called coworkers, friends, or family members. Once training is complete, the user can initiate calls by speaking the trained keywords, which the VR device recognizes by comparing the spoken utterances with the previously trained utterances (stored as templates) and taking the best match. For example, if the name "John" were one of the trained names, the user could initiate a call to John by saying the phrase "Call John." The VR system would recognize the words "Call" and "John," and would dial the number that the user had previously entered as John's telephone number. Garbage templates are used to represent all words not in the vocabulary.

Combining multiple VR engines provides enhanced accuracy and uses a greater amount of information in the input speech signal. A system and method for combining VR engines is described in U.S. patent application Ser. No. 09/618,177 (hereinafter '177 application) entitled "COMBINED ENGINE SYSTEM AND METHOD FOR VOICE RECOGNITION", filed Jul. 18, 2000, and U.S. patent application Ser. No. 09/657,760 (hereinafter '760 application) entitled "SYSTEM AND METHOD FOR AUTOMATIC VOICE RECOGNITION USING MAPPING," filed Sep. 8, 2000, which are assigned to the assignee of the present invention and fully incorporated herein by reference.

Although a VR system that combines VR engines is more accurate than a VR system that uses a singular VR engine, each VR engine of the combined VR system may include inaccuracies because of a noisy environment. An input speech signal may not be recognized because of background noise. Background noise may result in no match between an input speech signal and a template from the VR system's vocabulary or may cause a mismatch between an input speech signal and a template from the VR system's vocabulary. When there is no match between the input speech signal and a template, the input speech signal is rejected. A mismatch results when a template that does not correspond to the input speech signal is chosen by the VR system. The mismatch condition is also known as substitution because an incorrect template is substituted for a correct template.

An embodiment that improves VR accuracy in the case of background noise is desired. An example of background noise that can cause a rejection or a mismatch is when a cell phone is used for voice dialing while driving and the input speech signal received at the microphone is corrupted by additive road noise. The additive road noise may degrade voice recognition and accuracy and cause a rejection or a mismatch.

Another example of noise that can cause a rejection or a mismatch is when the speech signal received at a microphone placed on the visor or a headset is subjected to convolutional distortion. Noise caused by convolutional distortion is known as convolutional noise and frequency mismatch. Convolutional distortion is dependent on many factors, such as distance between the mouth and microphone, frequency response of the microphone, acoustic properties of the interior of the automobile, etc. Such conditions may degrade voice recognition accuracy.

Traditionally, prior VR systems have included a RASTA filter to filter convolutional noise. However, background noise was not filtered by the RASTA filter. Such a filter is described in U.S. Pat. No. 5,450,522. Thus, there is a need for a technique to filter both convolutional noise and background noise. Such a technique would improve the accuracy of a VR system.

In a VR system, whether it is a speaker-dependent or speaker-independent VR system, the number of templates that can be stored in a memory of both of these types of VR systems is limited by the size of the memory. The limited size of the memory limits the robustness of the VR system because of the limited number of templates that can be stored. A system and method that increases the number of templates that can be stored in the memory of these VR systems is desired.

SUMMARY

The described embodiments are directed to a system and method for improving storage of templates in a voice recognition system. In one aspect, a system and method for voice recognition includes recording a plurality of utterances, extracting features of the plurality of utterances to generate extracted features of the plurality of utterances, creating a plurality of VR models from the extracted features of the plurality of utterances, and lossy-compressing the plurality of VR models to generate a plurality of lossy-compressed VR models. In one aspect, A-law compression and expansion are used. In another aspect, mu-law compression and expansion are used. In one aspect, the VR models are Hidden Markov Models (HMM). In another aspect, the VR models are Dynamic Time Warping (DTW) models.

In one aspect, a voice recognition (VR) system comprises a training module configured to extract features of a plurality of utterances to generate extracted features of the utterances, create a plurality of VR models from the extracted features of the utterances, and lossy-compress the plurality of VR models to generate a plurality of lossy-compressed VR models. In one aspect, the VR system further comprises a feature extraction module configured to extract features of a test utterance to generate extracted features of a test utterance, an expansion module configured to expand a lossy-compressed VR model from the plurality of lossy-compressed VR models to generate an expanded VR model, and a pattern-matching module that matches the extracted features of the test utterance to the expanded VR model to generate a recognition hypothesis.

DETAILED DESCRIPTION OF PREFERRED EMBODIMENTS

Figure 1:
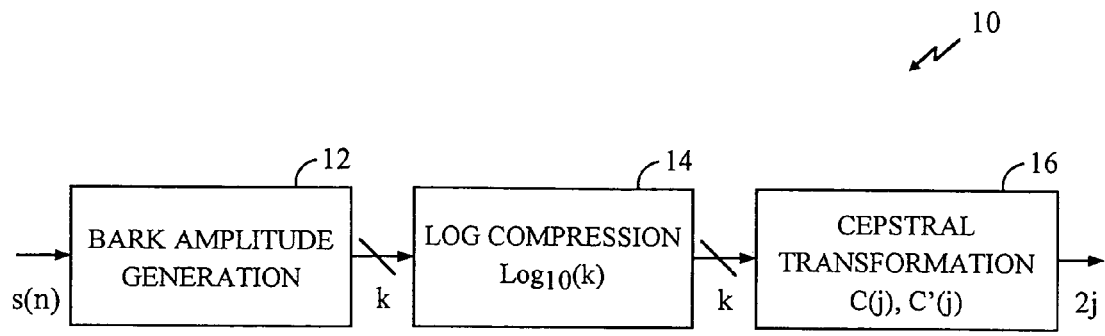
FIG. 1 shows a VR frontend in a VR system.

A VR system includes a frontend that performs frontend processing in order to characterize a speech segment. FIG. 1 shows a VR frontend 10 in a VR system. A Bark Amplitude Generation Module 12 converts a digitized PCM speech signal s(n) to k bark amplitudes once every T milliseconds. In one embodiment, T is 10 msec and k is 16 bark amplitudes. Thus, there are 16 bark amplitudes every 10 msec. It would be understood by those skilled in the art that k could be any positive integer. It would also be understood by those skilled in the art that any period of time may be used for T.

The Bark scale is a warped frequency scale of critical bands corresponding to human perception of hearing. Bark amplitude calculation is known in the art and described in Lawrence Rabiner & Biing-Hwang Juang, Fundamentals of Speech Recognition (1993), which is fully incorporated herein by reference.

The Bark Amplitude module 12 is coupled to a Log Compression module 14. The Log Compression module 14 transforms the bark amplitudes to a $log_{10}$ scale by taking the logarithm of each bark amplitude. The Log Compression module 14 is coupled to a Cepstral Transformation module 16. The Cepstral Transformation module 16 computes j static cepstral coefficients and j dynamic cepstral coefficients. Cepstral transformation is a cosine transformation that is well known in the art. See, e.g., Lawrence Rabiner & Biing-Hwang Juang, previously incorporated by reference. In one embodiment, j is 8. It would be understood by those skilled in the art that j can be any other positive integer. Thus, the frontend module 10 generates 2*j coefficients, once every T milliseconds. These features are processed by a backend module (not shown), such as an HMM module that performs voice recognition by matching HMM models to the frontend features.

HMM models are trained by computing the "j" static cepstral parameters and "j" dynamic cepstral parameters in the VR frontend. The training process collects a plurality of N frames that correspond to a single state. The training process then computes the mean and variance of these N frames, resulting in a mean vector of length 2j and a diagonal covariance of length 2j. The mean and variance vectors together are called a Gaussian mixture component, or "mixture" for short. Each state is represented by N Gaussian mixture components, wherein N is a positive integer. The training process also computes transition probabilities.

In devices with small memory resources, N is 1 or some other small number. In a smallest footprint VR system, i.e., smallest memory VR system, a single Gaussian mixture component represents a state. In larger VR systems, a plurality of N frames is used to compute more than one mean vector and the corresponding variance vectors. For example, if a set of twelve means and variances is computed, then a 12-Gaussian-mixture-component HMM state is created. In VR servers in a distributed voice recognition (DVR) system, N can be as high as 32.

Figure 2:
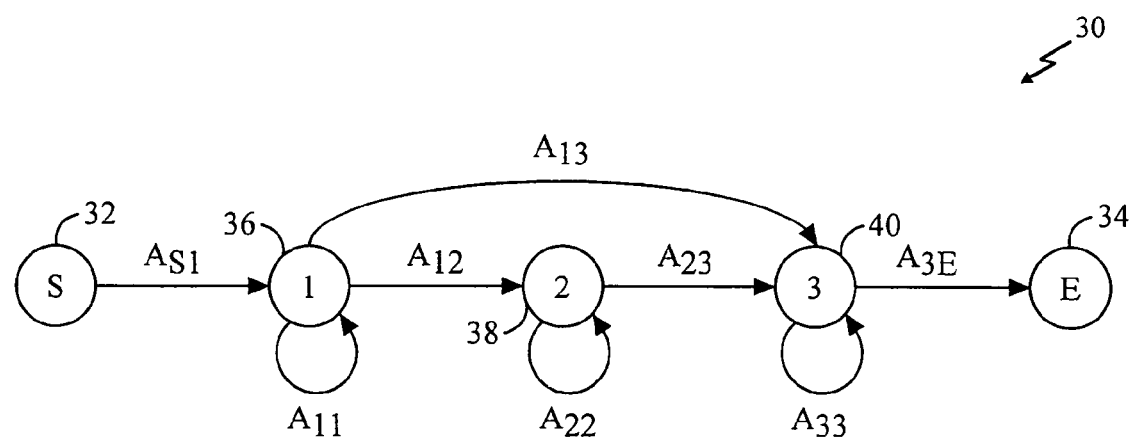
FIG. 2 shows an example Hidden Markov Model (HMM) for a speech segment.

An HMM model is a probabilistic framework for recognizing an input speech signal. In an HMM model, both temporal and spectral properties are used to characterize a speech segment. Each HMM model (whole word or sub-word) is represented by a series of states and a set of transition probabilities. FIG. 2 shows an example HMM model for a speech segment. The HMM model could represent a word, "oh," or a part of a word, "Ohio." The input speech signal is compared to a plurality of HMM models using Viterbi decoding. The best matching HMM model is considered to be the recognition hypothesis. The example HMM model 30 has five states, start 32, end 34, and three states for a represented triphone: state one 36, state two 38, and state three 40. In a typical backend, a whole word model is used with small vocabulary VR systems.

In medium-to-large vocabulary systems, sub-word models are used. Typical sub-word units are context-independent (CI) phones and context-dependent (CD) phones. A Context-independent phone is independent of the phones to the left and right. Context-dependent phones are also called triphones because they depend on the phones to the left and right of it. Context-dependent phones are also called allophones.

A phone in the VR art is the realization of a phoneme. In a VR system, context-independent phone models and context-dependent phone models are built using HMMs or other types of VR models known in the art. A phoneme is an abstraction of the smallest functional speech segment in a given language. Here, the word functional implies perceptually different sounds. For example, replacing the "k" sound in "cat" by the "b" sound results in a different word in the English language. Thus, "b" and "k" are two different phonemes in English language.

Transition $a_{ij}$ is the probability of transitioning from state i to state j. $a_{s1}$ transitions from the start state 32 to the first state 36. $a_{12}$ transitions from the first state 36 to the second state 38. $a_{23}$ transitions from the second state 38 to the third state 40. $a_{3E}$ transitions from the third state 40 to the end state 34. $a_{11}$ transitions from the first state 36 to the first state 36. $a_{22}$ transitions from the second state 38 to the second state 38. $a_{33}$ transitions from the third state 40 to the third state 40. $a_{13}$ transitions from the first state 36 to the third state 40.

A matrix of transition probabilities can be constructed from all transitions/probabilities: $a_{ij}$, wherein n is the number of states in the HMM model; i=1, 2, . . . , n; j=1, 2, . . . , n. When there is no transition between states, that transition/probability is zero. The cumulative transition/probabilities from a state is unity, i.e., equals one.

Figure 3:
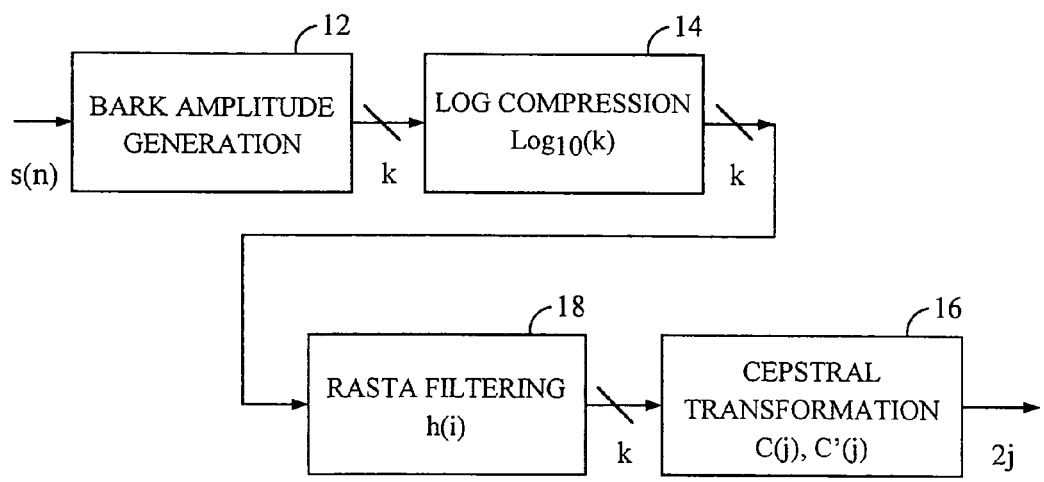
FIG. 3 shows a frontend of an HMM module of a VR system in accordance with an embodiment.

FIG. 3 shows a frontend of an HMM module of a VR system in accordance with an embodiment. A Bark Amplitude module 12 is coupled to a Log Compression module 14. The Log Compression module 14 is coupled to a RASTA filtering module 18. The RASTA filtering module 18 is coupled to a Cepstral Transformation module 16. The log Bark amplitudes from each of the k channels are filtered using a bandpass filter h(i). In one embodiment, the RASTA filter is a bandpass filter h(i) that has a center frequency around 4 Hz. Roughly, there are around four syllables per second in speech. Therefore, a bandpass filter having around a 4 Hz center frequency would retain speech-like signals and attenuate non-speech-like signals. Thus, the bandpass filter results in improved recognition accuracy in background noise and frequency mismatch conditions. It would be understood by those skilled in the art that the center frequency can be different from 4 Hz, depending on the task.

The filtered log Bark amplitudes are then processed by the Cepstral Transformation module to generate the 2*j coefficients, once every T milliseconds. An example of a bandpass filter that can be used in the VR frontend are the RASTA filters described in U.S. Pat. No. 5,450,522 entitled, "Auditory Model for Parametrization of Speech" filed Sep. 12, 1995, which is incorporated by reference herein. The frontend shown in FIG. 3 reduces the effects of channel mismatch conditions and improves VR recognition accuracy.

The frontend depicted in FIG. 3 is not very robust for background mismatch conditions. One of the reasons for this is that the Log compression process has a non-linear amplification effect on the bark channels. Log compression results in low amplitude regions being amplified more than high amplitude regions on the bark channels. Since the background noise is typically in the low amplitude regions on the bark channels, VR performance starts degrading as the signal-to-noise ratio (SNR) decreases. Thus, it is desirable to have a module that is linear-like in the low amplitude regions and log-like in the high amplitude regions on the bark channels.

This is efficiently achieved by using a log companding scheme, such as the G.711 log companding (compression and expansion) as described in the *International Telecommunication Union (ITU-T) Recommendation G.711 (11/88)- Pulse code modulation (PCM) of voice frequencies and in the G711.C, G.711 ENCODING/DECODING FUNCTIONS*. The ITU-T (for Telecommunication Standardization Sector of the International Telecommunications Union) is the primary international body for fostering cooperative standards for telecommunications equipment and systems.

There are two G.711 log companding schemes: a mu-law companding scheme and an A-law companding scheme. Both the mu-law companding scheme and the A-law companding scheme are Pulse Code Modulation (PCM) methods. That is, an analog signal is sampled and the amplitude of each sampled signal is quantized, i.e., assigned a digital value. Both the mu-law and A-law companding schemes quantize the sampled signal by a linear approximation of the logarithmic curve of the sampled signal.

Both the mu-law and A-law companding schemes operate on a logarithmic curve. Therefore the logarithmic curve is divided into segments, wherein each successive segment is twice the length of the previous segment. The A-law and mu-law companding schemes have different segment lengths because the mu-law and A-law companding schemes calculate the linear approximation differently.

The G.711 standard includes a mu-law lookup table that approximates the mu-law linear approximation as shown in Table 1 below. Under the mu-law companding scheme, an analog signal is approximated with a total of 8,159 intervals.

TABLE 1

| Value Range | Number of Intervals | Interval Size |
| --- | --- | --- |
| 0 | 1 | 1 |
| 1–16 | 15 | 2 |
| 17–32 | 16 | 4 |
| 33–48 | 16 | 8 |
| 49–64 | 16 | 16 |
| 65–80 | 16 | 32 |
| 81–96 | 16 | 64 |
| 97–112 | 16 | 128 |
| 113–127 | 16 | 256 |

The G.711 standard includes a A-law lookup table that approximates the A-law linear approximation as shown in Table 2 below. Under the A-law companding scheme, an analog signal is approximated with a total of 4,096 intervals.

TABLE 2

| Value Range | Number of Intervals | Interval Size |
| --- | --- | --- |
| 0–32 | 32 | 2 |
| 33–48 | 16 | 4 |
| 49–64 | 16 | 8 |
| 65–80 | 16 | 16 |
| 81–96 | 16 | 32 |
| 97–112 | 16 | 64 |
| 113–127 | 16 | 128 |

The G.711 standard specifies a mu-law companding scheme to represent speech quantized at 14 bits per sample in 8 bits per sample. The G.711 standard also specifies an A-law companding scheme to represent speech quantized at 13 bits per sample in 8 bits per sample. Exemplary 8-bit data is speech telephony. The G.711 specification is optimized for signals such as speech, with a Laplacian probability density function (pdf).

It would be understood by those skilled in the art that other companding schemes may be used. In addition, it would be understood by those skilled in the art that other quantization rates may be used.

Figure 4:
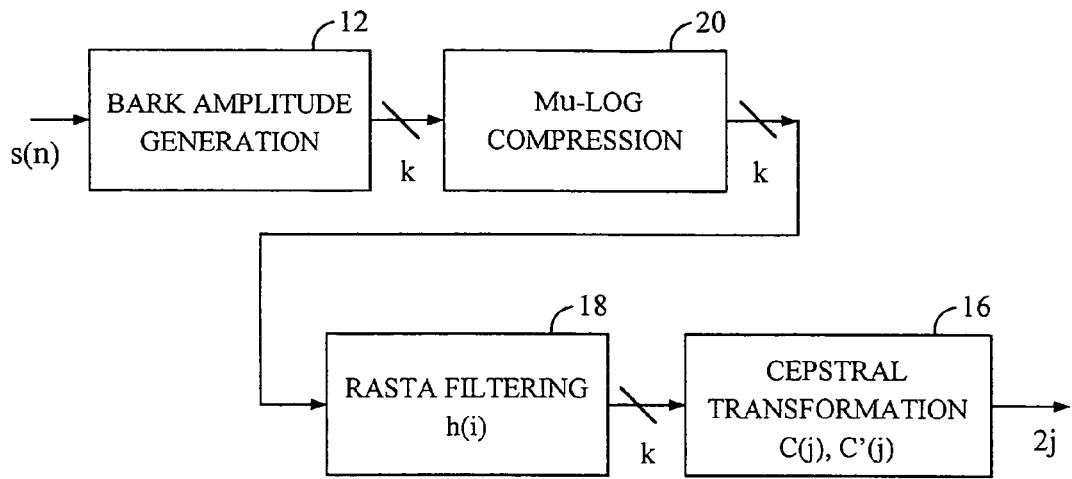
FIG. 4 shows a frontend having a mu-law companding scheme instead of log compression.

In one embodiment, a mu-law companding scheme 20 is used in the frontend instead of the log compression scheme, as shown in FIG. 4. FIG. 4 shows the frontend of an embodiment using a mu-law compression scheme, i.e., a mu-Log compression module 20. The Bark Amplitude Generation module 12 is coupled to the mu-Log Compression module 20. The mu-Log Compression module 20 is coupled to a RASTA filtering module 18. The RASTA filtering module 18 is coupled to a Cepstral Transformation module 16.

A digitized speech signal s(n), which includes convolutional distortion enters the Bark Amplitude Generation module 12. After the Bark Amplitude Generation Module 12 converts the digitized PCM speech signal s(n) to k bark amplitudes, the convolutional distortion becomes multiplicative distortion. The mu-Log Compression module 20 performs mu-log compression on the k bark amplitudes. The mu-log compression makes the multiplicative distortion additive. The Rasta filtering module 18 filters any stationary components, thereby removing the convolution distortion since convolutional distortion components are stationary. The Cepstral Transformation module 16 computes j static cepstral coefficients and j dynamic cepstral coefficients from the RASTA-filtered output.

Figure 5:
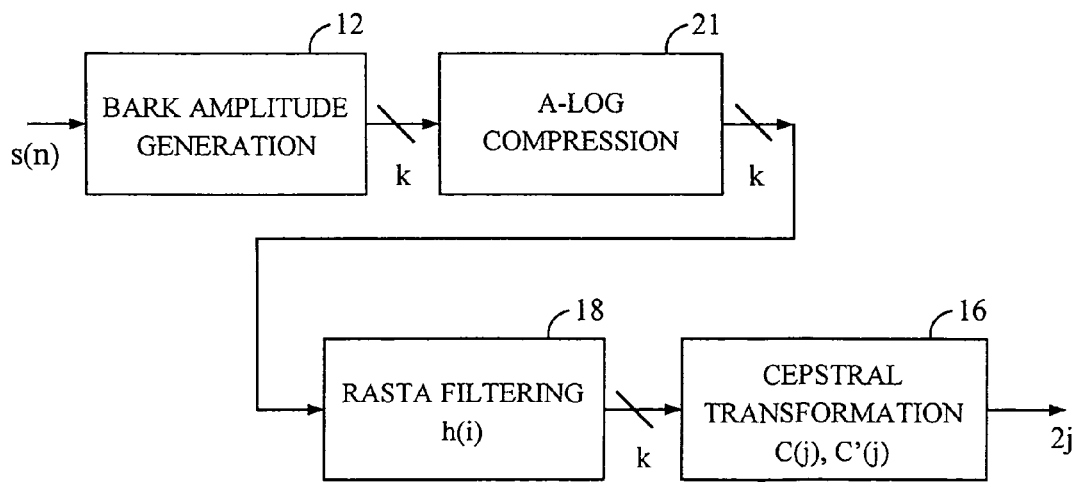
FIG. 5 shows a frontend having an A-law companding scheme instead of log compression.

In another embodiment, an A-law compression scheme 21 is used in the frontend instead of a log compression scheme, as shown in FIG. 5. FIG. 5 shows the frontend of an embodiment using an A-law compression scheme, i.e., an A-Log compression module 21. The Bark Amplitude module 12 is coupled to the A-Log Compression module 21. The A-Log Compression module 21 is coupled to a RASTA filtering module 18. The RASTA filtering module 18 is coupled to a Cepstral Transformation module 16.

Both Mu-log compression and A-log compression are lossy compression techniques. Any lossy compression technique can be used for compressing the k bark amplitudes. Lossy compression is when the resultant of compression and expansion of a source is not identical to the source. Lossy compression is more useful than a lossless compression because expanding a lossy compressed model takes less time than expanding a lossless model. In addition, lossy compression software cost less than lossless compression software.

An embodiment employing G.711 mu-law companding has two functions called ulaw_compress for compressing bark amplitudes and mulaw_expand for expanding filter outputs to produce bark amplitudes. In one embodiment, the mu-Log compression module 20 implements the compression using the following formula:

Log_Bark $(i)=\{255-\text{mulaw\_compress}[\text{Bark}(i)]\}*C$,
where $C$ is a constant.

The value of C can be adjusted to take advantage of the available resolution in a fixed-point VR implementation.

Figure 6:
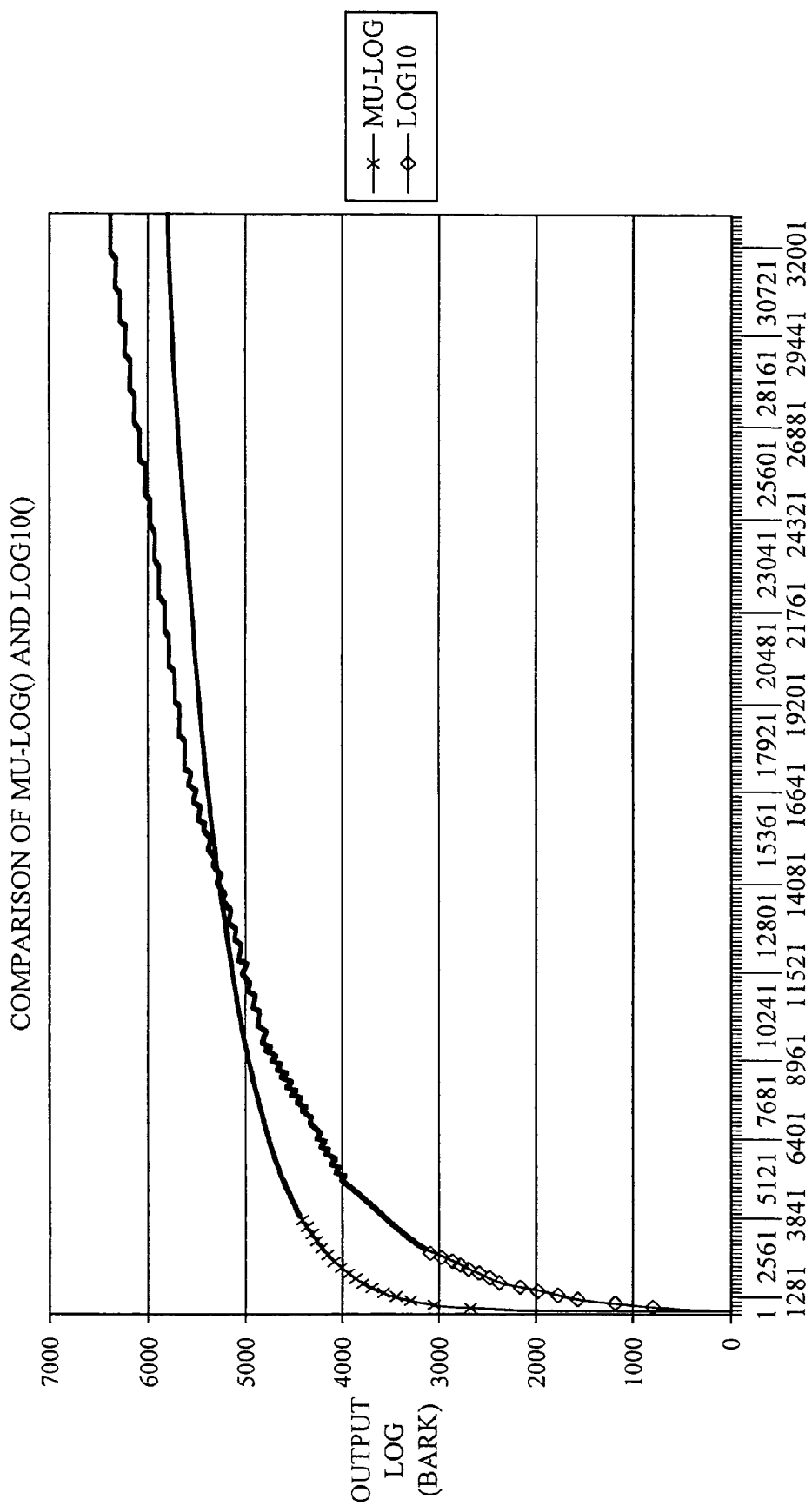
FIG. 6 shows a plot of a fixed point implementation of a $Log_{10}(\ )$ function and the mu-Log function, with C=50.

FIG. 6 shows a plot of a fixed-point implementation of the $\text{Log}_{10}()$ function and the mu-Log function, with C=50. FIG. 6 shows that for low amplitude signals, the mu-Log function is more linear than the $\text{Log}_{10}()$ function, whereas for high amplitude signals, the mu-Log function is logarithmic. Thus, the mu-Log function is a non-uniform quantizer since it treats low amplitude and high amplitude signals differently.

In some recognition schemes, the backend operates on the bark channel amplitudes, rather than static and dynamic cepstral parameters. In the combined engine scheme described in the '177 application and the '760 application, the DTW engine operates on bark channel amplitudes after time-clustering and amplitude quantization. The DTW engine is based on template matching. Stored templates are matched to features of the input speech signal.

Figure 7:
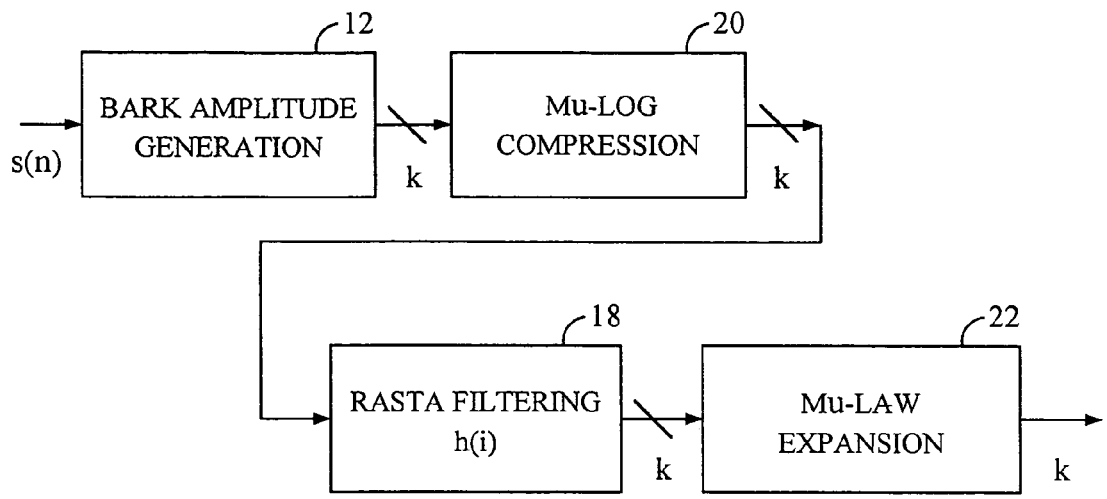
FIG. 7 shows a frontend in accordance with an embodiment using mu-law compression and mu-law expansion.

The DTW engine described in the '177 application and the '760 application is more robust to background mismatch conditions than to channel mismatch conditions. FIG. 7 depicts a frontend of an embodiment that improves the DTW engine for channel mismatch conditions. FIG. 7 shows a frontend in accordance with an embodiment using mu-law compression and mu-law expansion, i.e., the mu-Log compression module 20 and the mu-law expansion module 22. The Bark Amplitude module 12 is coupled to a mu-Log Compression module 20. The mu-Log Compression module 20 is coupled to a RASTA filtering module 18. The RASTA filtering module 18 is coupled to the mu-law expansion module 22. The mu-Log Compression module 20 performs A-log compression on k bark amplitudes. The Rasta filtering module 18 filters any stationary components from the k bark amplitudes, thereby removing any convolution distortion since convolutional distortion components are stationary. The mu-log expansion module 22 performs mu-log expansion of the RASTA-filtered bark amplitudes.

In one embodiment, the Mu-Log expansion is implemented using the following formula:

Bark'$(i)$=mulaw_expand$\{255-[R(i)*D]\}$, where $D$ is a constant.

R(i) is the output of the RASTA module and D=0.02 (or 1/C). In one embodiment, the product [R(i)*D] is in the 0-to-127 range. The Mu-Log expansion puts the Bark'(i) in the bark amplitude range and the adverse effects of channel mismatch conditions are removed by the RASTA processing.

Figure 8:
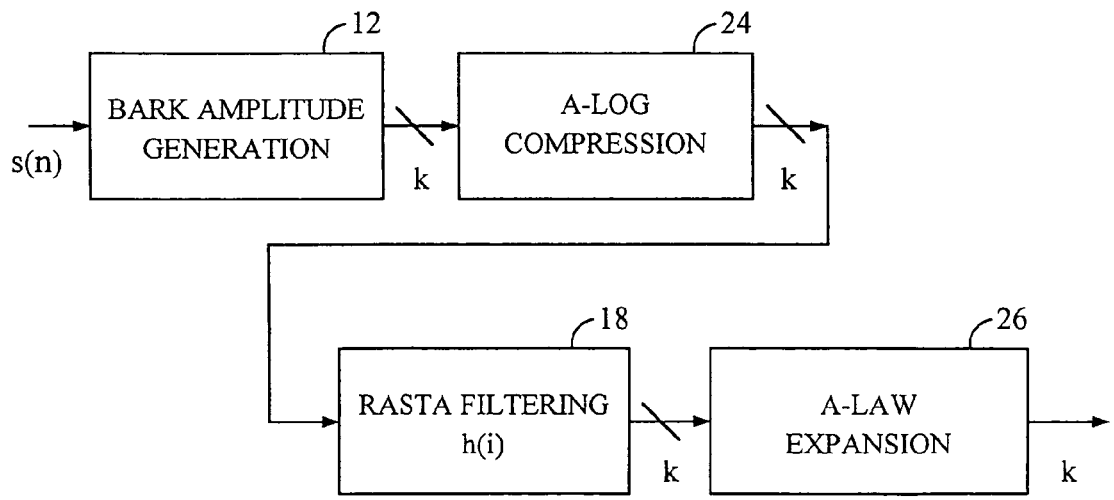
FIG. 8 shows a frontend in accordance with an embodiment using A-law compression and A-law expansion.

FIG. 8 depicts an embodiment for improving the DTW engine for channel mismatch conditions. FIG. 8 shows a frontend in accordance with an embodiment using A-law compression and A-law expansion, i.e., an A-Log compression module 24 and an A-law expansion module 26. A Bark Amplitude module 12 is coupled to the A-Log Compression module 24. The A-Log Compression module 24 is coupled to a RASTA filtering module 18. The RASTA filtering module 18 is coupled to the A-law expansion module 26. The A-Log Compression module 20 performs A-log compression on k bark amplitudes. The Rasta filtering module 18 filters any stationary components from the k bark amplitudes, thereby removing any convolution distortion since convolutional distortion components are stationary. The A-log expansion module 26 performs A-log expansion of the RASTA-filtered bark amplitudes.

Not only can Mu-law and A-law compression and expansion be used in the frontend of a VR system to characterize a speech segment, but in one embodiment, they are used for compressing and expanding states of a VR model. In one embodiment, the VR system compresses and expands means and variances of an HMM model. In another embodiment, the VR system compresses and expands templates of a DTW model.

In an HMM VR system, the vocabulary words are represented by a sequence of HMM states. Each state comprises a set of means, variances, and transition probabilities to other states in the vocabulary word.

In other VR systems that are not based on HMM, such as a DTW VR system, the vocabulary words are represented by a set of means and/or variances derived from extracting features of a training corpus. A "training corpus" comprises of multiple utterances of the vocabulary words recording by a large number of users. In one embodiment, the vocabulary words are represented by a set of means. In another embodiment, the vocabulary words are represented by a set of means and variances.

Figure 9:
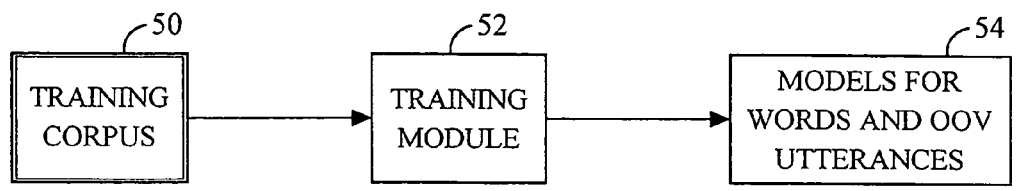
FIG. 9 shows a block diagram of input, processing, and output of a training process to generate models in accordance with one embodiment.

FIG. 9 shows a flowchart of input 50, training module 52, and output model 54 of the training process to generate models, also called templates, in accordance with one embodiment. The training process involves computing components of all states for all words in the VR vocabulary, including garbage models to represent Out-Of-Vocabulary (OOV) utterances during recognition. A training corpus comprised of multiple utterances of the vocabulary words to be recognized is created by recording a large number of users. The training corpus is the input 50 into the training module 52 that processes the training corpus to create the output of the training module 52, compressed models for the vocabulary words and OOV utterances 54. The training module 52 creates models from the training corpus and compresses those models. In one embodiment, the training module 52 comprises a feature extraction module (not shown) that creates models from the training corpus 50 and a compression module (not shown) that compresses those models.

In one embodiment, the training module 52 creates HMM models and performs A-law compression of the HMM models. The A-law compression enables storage of more models than using no compression scheme for the same amount of storage space, i.e., memory. In another embodiment, the training module 52 creates DTW models and performs mu-law compression of the DTW models. The mu-law compression enables storage of more models than using no compression scheme for the same amount of storage space, i.e., memory. Thus, whether the models are speaker-independent or speaker-dependent, A-law and mu-law compression reduces the memory requirements in a VR system. In yet another embodiment, the training module uses another lossy compression technique other than A-law and Mu-law compression to compress models. It would be understood by those skilled in the art that any model VR technique known in the art can be used in place of the HMM and DTW models.

Figure 10:
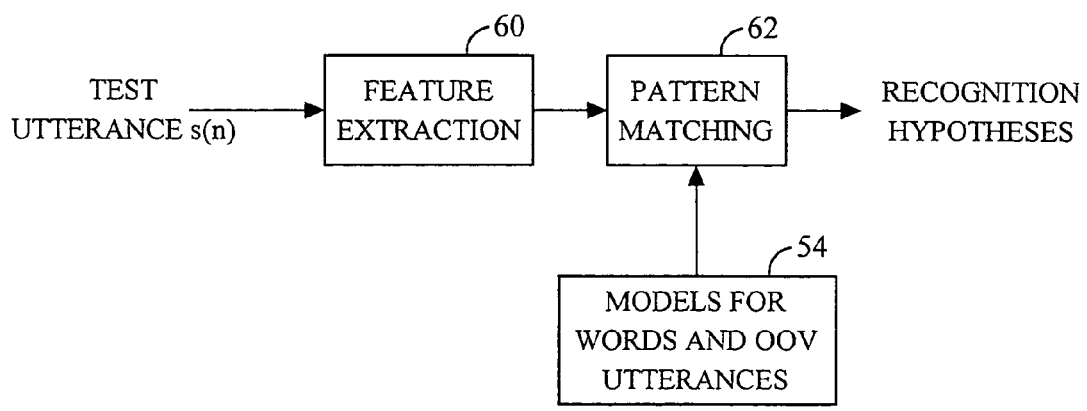
FIG. 10 shows a VR system in accordance with one embodiment.

FIG. 10 shows a VR system in accordance with one embodiment. A feature extraction module 60 extracts features from a test utterance s(n). The features are transferred to a backend module, the pattern-matching module 62. The pattern-matching module 62 matches the features to models for the vocabulary words and OOV utterances 54. In one embodiment, the pattern-matching module 62 is an HMM module that matches the features to HMM models and thereby produces recognition hypotheses. In another embodiment, the pattern-matching module 62 is a DTW module that matches features to DTW models and thereby produces recognition hypotheses.

Figure 11:
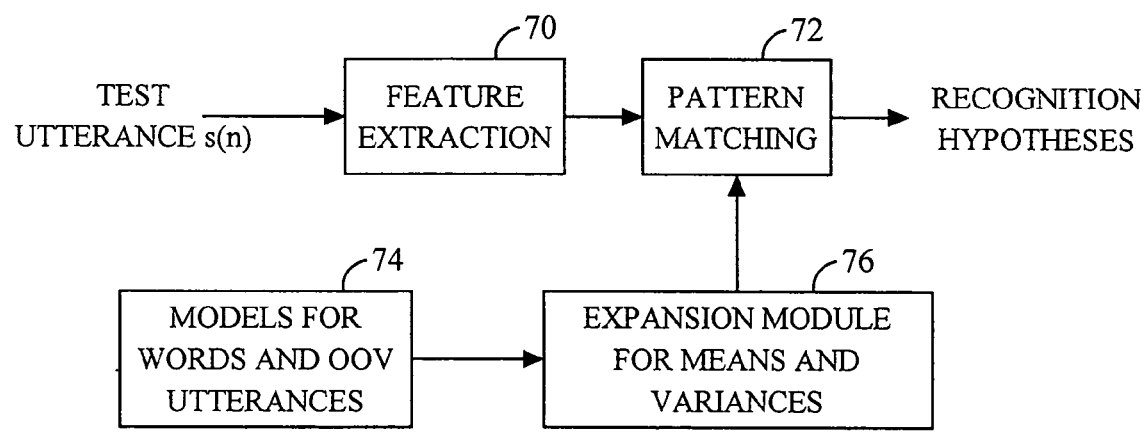
FIG. 11 shows a VR system in accordance with an embodiment that uses expansion of compressed-trained models during voice recognition.

FIG. 11 shows a VR system in accordance with an embodiment that uses expansion of compressed-trained models during voice recognition. A feature extraction module 70 extracts features from a test utterance s(n). The features are transferred to a backend module, the pattern-matching module 72. The pattern-matching module 72 matches the features to models for the vocabulary words and OOV utterances 74 that have been processed by an Expansion Module 76 for means and variances. Using a grammar (not shown) specified by a VR application (not shown), the pattern-matching module 62 obtains models from the Expansion Module 76. A VR application typically is service logic that enables users to accomplish a task using the VR system. The service logic may be executed by a processor on a subscriber unit. The service logic is a component of a user interface module (not shown) in the subscriber unit.

The grammar specifies the active vocabulary using word models in small vocabulary VR systems and sub-word models in large vocabulary VR systems. Typical grammars include 7-digit phone numbers, dollar amounts, and a name of a city from a set of names. Typical grammar specifications include an OOV condition to represent the condition where a confident recognition decision could not be made based on the input speech signal.

The grammar specifies syntax. The syntax limits the order of word and sub-word models to be matched to the extracted features. The pattern-matching module 72 requests from the Expansion module 76, the models that need to be expanded. The Expansion module 76 expands compressed models 72 that the pattern-matching module 72 requests. In one embodiment, the Expansion Module 76 expands HMM models. In another embodiment, the Expansion Module expands DTW models. If the models were compressed with A-law compression, then the models are expanded with A-law expansion. If the models were compressed with mulaw compression, then the models are expanded using mu-law expansion.

In one embodiment, the pattern-matching module 72 is an HMM module that matches the features to expanded HMM models and thereby produces recognition hypotheses. In another embodiment, the pattern-matching module 72 is a DTW module that matches features to expanded DTW models and thereby produces recognition hypotheses.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

As examples, the various illustrative logical blocks, modules, and mapping described in connection with the embodiments disclosed herein may be implemented or performed with a processor executing a set of firmware instructions, an application specific integrated circuit (ASIC), a field programmable gate array (FPGA) or other programmable logic device, discrete gate or transistor logic, discrete hardware components such as, e.g., registers, any conventional programmable software module and a processor, or any combination thereof designed to perform the functions described herein. The VR system components, such as the Bark Amplitude Generation 12, RASTA filtering module 18, Mu-log Compression module 20, A-log Compression module 21, Mu-log Expansion 22, A-log Expansion 26, the Cepstral Transformation module 16, the Training Module 50, the Pattern Matching Module 62 and the Expansion Module 70 may advantageously be executed in a microprocessor, but in the alternative, the Bark Amplitude Generation 12, RASTA filtering module 18, Mu-log Compression module, A-log Compression module 20, Mu-log Expansion module 22, A-log Expansion module 26, the Cepstral Transformation module 16, the Training Module 50, the Pattern Matching Module 62 and the Expansion Module 70 may be executed in any conventional processor, controller, microcontroller, or state machine. The models/templates could reside in RAM memory, flash memory, ROM memory, EPROM memory, EEPROM memory, registers, hard disk, a removable disk, a CD-ROM, or any other form of storage medium known in the art. The memory (not shown) may be integral to any aforementioned processor (not shown). A processor (not shown) and memory (not shown) may reside in an ASIC (not shown). The ASIC may reside in a telephone.

The previous description of the embodiments of the invention is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method of voice recognition (VR), comprising:
recording a plurality of utterances;
extracting features of the plurality of utterances to generate extracted features of the plurality of utterances;
creating a plurality of VR models from the extracted features of the plurality of utterances; and
lossy-compressing the plurality of VR models to generate a plurality of lossy-compressed VR models.

2. The method of claim 1, further comprising expanding the plurality of lossy-compressed VR models to generate a plurality of expanded VR models.

3. The method of claim 2, further comprising comparing a expanded VR model of the plurality of expanded VR models to features of a test utterance.

4. The method of claim 2, further comprising extracting features of a test utterance.

5. The method of claim 4, further comprising matching the extracted features of the test utterance to an expanded VR model of the plurality of expanded VR models to generate a match.

6. The method of claim 5, further comprising generating a hypothesis for the match.

7. The method of claim 1, wherein the lossy-compression is A-law compression of the plurality of VR models to generate a plurality of A-law compressed VR models.

* * * * *